United States Patent [19]

Stout et al.

[11] Patent Number: 4,934,649

[45] Date of Patent: Jun. 19, 1990

[54] APPLIANCE THEFT DETERRENT DEVICE

[76] Inventors: Glenn M. Stout, 2000 Argonne Dr., Minneapolis, Minn. 55421; Bryan D. Stout, 5198 St. Moritz Dr., Fridley, Minn. 55421

[21] Appl. No.: 277,657

[22] Filed: Nov. 29, 1988

[51] Int. Cl.[5] .............................................. F16M 13/00
[52] U.S. Cl. ...................................................... 248/551
[58] Field of Search ........................ 248/551; 70/58, 57

[56] References Cited

U.S. PATENT DOCUMENTS

| | | | |
|---|---|---|---|
| 3,643,250 | 2/1972 | Sander . | |
| 3,664,616 | 5/1972 | Raskin . | |
| 3,744,282 | 7/1973 | Hemphill . | |
| 3,771,338 | 11/1973 | Raskin | 70/58 |
| 3,785,183 | 1/1974 | Sander | 70/58 |
| 3,859,826 | 1/1975 | Singer et al. | 70/58 |
| 3,910,079 | 10/1975 | Gassaway . | |
| 3,932,857 | 1/1976 | Way et al. . | |
| 3,984,075 | 10/1976 | Bahner et al. . | |
| 3,990,276 | 11/1976 | Shontz . | |
| 4,055,973 | 11/1977 | Best . | |
| 4,066,231 | 1/1978 | Bahner et al. . | |
| 4,211,995 | 7/1980 | Smith . | |
| 4,212,175 | 7/1980 | Zakow | 70/58 |
| 4,268,099 | 5/1981 | Clausen | 248/551 X |
| 4,300,371 | 11/1981 | Herwick et al. | 70/58 |
| 4,316,181 | 2/1982 | Primont et al. . | |
| 4,570,465 | 2/1986 | Bennett | 70/58 X |
| 4,656,848 | 4/1987 | Rose | 70/58 |
| 4,739,637 | 4/1988 | Finkel et al. | 70/58 |

*Primary Examiner*—David M. Purol
*Attorney, Agent, or Firm*—Dorsey & Whitney

[57] ABSTRACT

A theft deterrent device comprises an anchor means for securing the theft deterrent device to the bottom surface area of a secured item, a thin high tensile wire means operably connected to the anchor means for extending through a small drill hole in a horizontal mounting surface, and a locking means below the bottom of the horizontal mounting surface for coupling with and tensioning the thin high tensile wire means, whereby when the thin wire means is extended through the small drill hole and coupled with the locking means the theft deterrent device and the secured item are secured to the horizontal mounting surface.

9 Claims, 1 Drawing Sheet

APPLIANCE THEFT DETERRENT DEVICE

TECHNICAL FIELD

The present invention relates generally to the field of theft deterrent devices. More particularly, the present invention relates to an appliance theft deterrent device for securing small appliances or the like, such as a personal computers, televisions, calculators, or other small electric or non-electric items to a tabletop or countertop surface without damage to the tabletop or countertop surface in such a manner as to deter the removal of the appliance.

BACKGROUND ART

The invention relates to a theft deterrent device to be used with surface mounted small appliances, computers, display objects or other such appliance-like items of value. There is a significant risk of theft when such items are located where a theft could occur during unattended hours such as an office environment, or when such items are positioned in places of risk because of ease of access to the item, no alarms or monitoring devices, large crowds or crowd confusion such as retail stores, museums, trade shows, or the like. Because of their relatively small size, these items may be easily removed from their location and sold for a quick cash sale. The increasing numbers of surface mounted computers and small appliances in the work place and educational facilities is creating an ever increasing base from which thefts can and do occur.

Prior art theft protection and locking devices for such appliance-like items, particularly office equipment items, have attempted to provide various mechanisms for securing the items to a surface. For example, U.S. Pat. Nos. 3,744,282, 3,910,079, 3,990,276, and 4,066,231 all describe devices for locking office equipment to a table top surface. While such theft protection devices offer varying degrees of theft protection for the item, the items are frequently mounted on desks, counters and tables and other surfaces that have an aesthetically pleasing and smooth work surface and all of these prior art theft protection devices involve significant and irreparable alteration to the surface on which the item is mounted. In particular, all of these theft protection devices require that a relatively large hole be drilled in the surface on which the item is mounted so that some type of anchoring mechanism, such as a bolt or cable, may be passed through the hole to be secured to the bottom side of the surface. As a result, once the theft protection device is installed on a surface, it can not be removed because of the large anchor hole created in the surface.

Accordingly, it would be advantageous to have an appliance theft deterrent device for securing small appliances or the like to a tabletop or countertop surface that could provide adequate theft deterrence without damaging the tabletop or countertop surface on which the appliance is mounted.

SUMMARY OF THE INVENTION

In accordance with the present invention, a theft deterrent device is provided for securing an appliance-like item to a generally horizontal surface, the secured item having bottom support means or legs for supporting the secured item in an upright position in contact with the top of the horizontal surface and a bottom surface area generally parallel to and not in contact with the horizontal surface when the secured item is in an upright position. The theft deterrent device comprises anchor means for securing the theft deterrent device to the device to the bottom surface area of the secured item, a thin high tensile wire means operably connected to the anchor means for extending through a small drill hole in a horizontal surface, and locking means below the bottom of the horizontal surface for coupling with and tensioning the thin high tensile wire means, whereby when the thin wire means is extended through the small drill hole and coupled with the locking means the theft deterrent device and the secured item are secured to the horizontal surface.

In the preferred embodiment, an anchor plate is affixed to the bottom of the secured item by screws and/or high tensile adhesives and a small diameter (less than 1.5 MM), high tensile (350,000 psi) steel wire is attached to the anchor plate and extends downward through a small hole (1.6 MM) in the mounting surface, with said high tensile wire captured securely by a locking bushing on the underside of mounting surface. Because the thin wire would be visible beneath the secured item, a hardened steel spacer of approximately 18 MM diameter is positioned around the wire, and secured in place by the downward projecting anchor ear on the anchor plate, to give a robust and secure impression to a uninformed observer. To further disguise the locking bushing on the underside of the mounting surface, a steel cover means is secured over the locking bushing to the underside of the mounting surface with high tensile adhesive to give the impression of a large nut or the like.

Accordingly, it is an objective of the present invention to provide a theft deterrent device that presents the appearance of a more substantial locking mechanism and provides an adequate amount of holding force to create a significant deterrent to the removal of the secured item from the horizontal mounting surface under most conditions.

Another objective of the present invention is to provide a theft deterrent device that can be attached to and removed from a horizontal mounting surface without permanent damage to or alteration of the mounting surface.

A further objective of the present invention is to provide a theft deterrent device that is relatively inexpensive and easy to install and remove.

These and many other objectives of the present invention will become apparent with reference to the drawings, the description of the preferred embodiment and the appended claims.

DESCRIPTION OF THE PREFERRED EMBODIMENT

Figure 1:
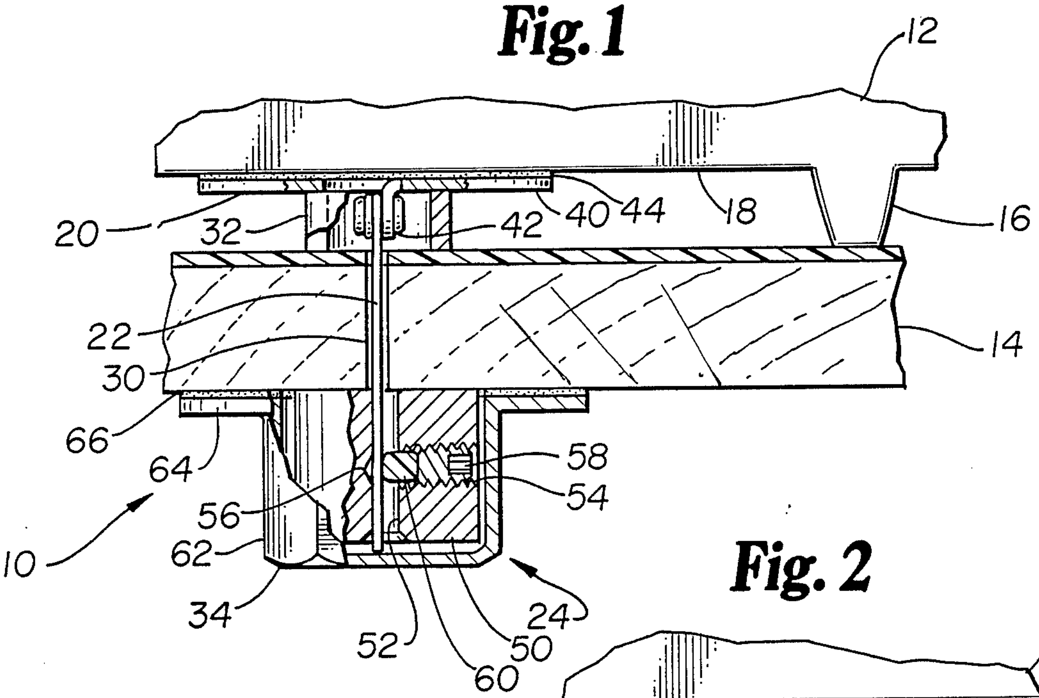
FIG. 1 is a side elevational view of the preferred embodiment of the present invention with parts cut away and showing a fragment an appliance-like item and a fragmentary section of a table top.

Referring now to FIG. 1, the preferred embodiment of a theft deterrent device 10 in accordance with the present invention will be described. The theft deterrent device 10 is used to secure an appliance-like item 12, such as a personal computer, television, calculator, or other small appliance, to a generally horizontal surface 14, such as a tabletop, countertop or desktop surface. The secured item 12 includes some type of bottom support means 16, such as legs or risers, for supporting the secured item 12 in a generally upright position on the horizontal surface 14 with the support means 16 in contact with the horizontal surface 14. A bottom surface area 18 of the secured item 12 is generally parallel to and not in contact with the horizontal surface 14 when the secured item 12 is in its upright position with respect to the horizontal surface 14. The distance between the bottom surface area 18 and the horizontal surface 14 is usually not more than 1 inch and is typically less than ½ inch. For example, most personal computers have a 5/16th inch space between the bottom surface area 18 and the horizontal surface 14 that the computer is resting on. While the bottom support means 16 is generally an integral part of the secured item 12, it should be recognized that the bottom support means could be any type of spacer means for creating a sufficient gap between the bottom surface area 18 and the horizontal surface 14 to allow the present invention to be attached to the secured item 14.

The theft deterrent device 10 is comprised of an anchor means 20 for securing the device 10 to the bottom surface area 18, a thin high tensile wire means 22 operably connected to the anchor means 20, and a locking means 24 for coupling with and tensioning the thin wire means 22. The thin wire means 22 is smaller in diameter than a small drill hole 30 in the horizontal surface 14, such that when the thin wire 22 is extended through the small drill hole 30 and coupled with the locking means 24, the theft deterrent device 10, and consequently the secured item 12, are secured to the horizontal surface 14.

The anchor means 20 is comprised of a circular anchor plate 40 having 0.062 inch thick H.H.C.R. Steel having a zinc chromate finish. The anchor plate 40 is 2.125 inches in diameter. An anchor ear 42 is punched from the center of the anchor plate 40 and is attached to the anchor plate 40 by a bend line and depends perpendicular therefrom. The anchor ear 42 includes a 3/32 inch diameter aperture through which the thin wire means 22 is threaded and attached to. Attachment of the thin wire means 22 to the anchor ear 42 may be accomplished by any variety of means including twisting one end of the thin wire means 22 around itself or creating a loop in one end of the thin wire means 22 and passing a rivet through the anchor ear 42 and the loop.

Figure 3:
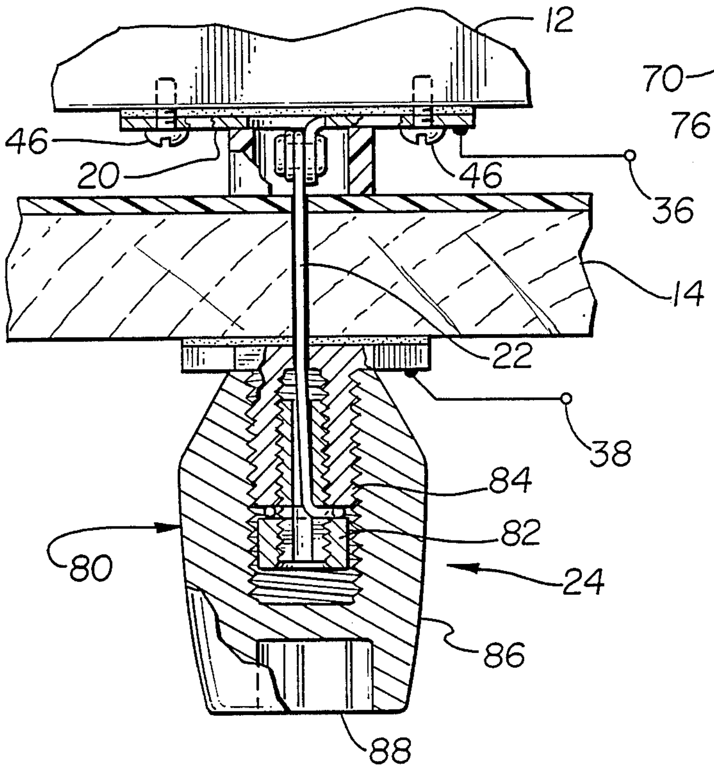
FIG. 3 is a view similar to FIG. 1 showing another alternate form of the present invention.

The anchor plate 40 may be attached to the bottom surface area 18 by means of a high tensile adhesive 44, such as 3M Pronto #CA-40H, available from 3M Company, St. Paul, Minnesota. Another method of securing the anchor plate 40 to the bottom surface area 18 of the secured item 12 is accomplished by screwing a plurality of screw 46, as shown in FIG. 3, through holes that are drilled in the anchor plate 40. It will be obvious that any number of other means of attaching the anchor means 20 to the bottom surface area 18 of the secured item 12 may be employed and still be within the scope of the present invention.

The thin wire means 22 is a high tensile having a diameter of less than about 3 MM, preferably a piano wire having a diameter of 1.4 MM. The maximum diameter of the thin wire means 22 is limited to the just smaller than the largest diameter of the small hole 30 such that when the thin wire means 22 is removed from the small hole 30, the small hole 30 may be filled in such that it will not be apparent, and that there will be no permanent damage to or alteration of the surface 14. The purpose of using the thin wire means 22 is twofold. First, even though the diameter of the thin wire means is very small, the high tensile strength of such a wire creates a sufficiently large holding force to prevent the vertical removal of the secured item 12 without the use of leverage tools, such as a crow bar, that would also damage the secured item 12. Second, the small diameter of the thin wire means 22 allows the theft prevention device 10 to be used on surface where it is desirable not to damage the horizontal surface 14. In the event that the device 10 is removed from the horizontal surface 14, a small amount of carpenter's or furniture finisher's wax or putty matching the hue and color of the surface may be applied to the small drill hole 30 to effectively render it unnoticeable. Consequently, the device 10 of the present invention may be used to secure appliance-like items to hardwood desks, formica countertops, and other expensive surfaces where a traditional theft protection device could not be used because of the damage caused to the surface.

Referring now to FIG. 1, the preferred embodiment of the locking means 24 will be described. The locking means 24 consists of a locking bushing 50 with a center bore 52 through which the thin wire means 22 is passed. A radial threaded hole 54 is drilled through the center bore 52 creating a dimple 56 opposite the threaded hole 54. A set screw 58 is adapted to be threaded into the threaded hole 54 for frictionally engaging a brass slug 60 with the thin wire means 22 and the dimple 56 to lock the thin wire means 22 in place. The locking bushing 50 is a 5/8" steel rod with a center bore 52 which is 0.086" in diameter (#44 drill bit). The threaded hole 54 is a tap 10–32 with a 0.218" minimum depth of full thread. The set screw 58 is a pin-head security screw that has a hex-Allen head with a small round pin in the center of the hex, available from Tamperproof Screw Company, Hicksville, New York. The small round pin requires a special drilled hole in the end of the Allen wrench in order to engage it. Standard Allen wrenches cannot be easily drilled with such pin holes because of they are hardened. The brass slug is 0.156" diameter and 0.156" long and prevents damages to the thin wire means 22 so that the wire will not break easily. To lock the thin wire means 22 in the locking bushing 50, the slug 60 is placed in the threaded hole 54, the set screw 58 is threaded into the threaded hole 54, the locking bushing 50 is slid over the thin wires means 22 and abuts the bottom side of the horizontal surface 14, and, with the thin wire means 22 tensioned by means of a pliers, the set screw 58 is now tightened.

In another embodiment (not shown), the threaded hole 54, set screw 58 and brass slug 60 may be replaced with a wedge device inserted into a tapered hole for securing the thin wire means 22 between a V-shaped notch in the small end of the wedge device. While only certain embodiments of the locking means 24 are described, it will be seen that any number of frictional or threaded means may be used to secure the thin wire means 22 to the locking means 24 below the horizontal surface 14.

In the preferred embodiment shown in FIG. 1, the theft deterrent device 10 further include a spacer 32 for surrounding the thin wire means 22 where it is attached to the anchor means 20 and filling the space between the bottom surface area 18 and the horizontal surface 14.

The spacer 32 is a comprised of a 5/8th inch diameter 1020 steel tube approximately 5/16th inches high. The tube is treated with a Melanite (trademark) treatment that is a proprietary thin epsilon-iron nitride case hardening treatment available from Getchell Steel Treating, Minneapolis, Minnesota. In operation, the interior diameter of the spacer 32 is sufficiently large enough to allow the spacer 32 to freely rotate about the thin wire means 22. Because the spacer 32 will rotate in response to an applied horizontal pressure, for example a hacksaw blade, the spacer 32 is very difficult to cut in a horizontal manner and effectively prevents access to the thin wire means 22 from the space between the bottom surface area 18 and the horizontal surface 14.

The preferred embodiment of the theft deterrent device 10 also includes a cover means 34 in the form of a cup 62 having any exterior shape desired that will enclose the volume occupied by the locking means 24. In this embodiment, the cup 62 is fashioned from 0.062" C.R.Steel and finished with a zinc plate and resembles a semi-spherical dome. In an alternate embodiment, the exterior of the cup 62 can be fashioned to resemble a hexagonal bolt head. The cup 62 includes an annular ring 64 to which an adhesive 66 similar to the adhesive 44 used for the anchor means 20 may be used to secure the cup 62 to the bottom of the horizontal surface 14.

Figure 2:
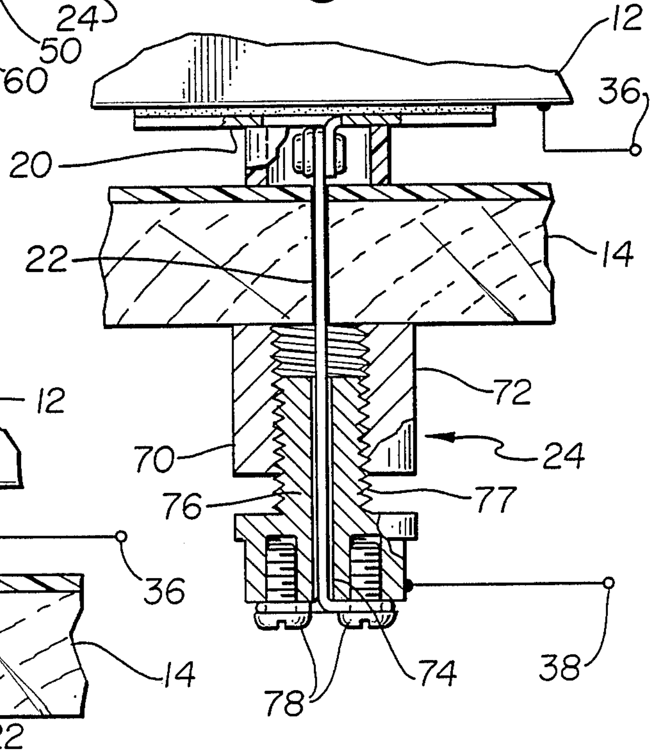
FIG. 2 is a view similar to FIG. 1 showing an alternate form of the present invention.

As shown in FIGS. 2 and 3, the theft deterrent device 10 may also include a pair of electrical connections 36 nd 38 for incorporating an alarm mechanism (not shown) with the device 10. Once the device 10 has been installed, an electrical circuit can be established from the secured device 12 or the anchor means 20 through the thin wire means 22 to the locking means 24. In the event that an attempt is made to remove the secured item 12 from the horizontal surface 14 and the thin wire means 22 is broken, an alarm could sound or an indication could be sent to a central office indicating that a theft of the secured item 12 was occurring.

Referring now to FIG. 2, an alternate embodiment of the locking means 24 of the present invention is shown. The locking means 24 is comprised of a drawback bushing 70 having an internally threaded nut 72 that mates with an externally threaded bolt 74 having a center bore 76 through which the thin wire means 22 extends. The thin wire means 22 is secured to the head of the bolt 74 by means of a pair of machine screws 78 around which the thin wire means 22 is looped. To secure the drawback bushing 70 to the thin wire means 22, the bolt 76 is screwed into the nut 72 and the assembly is slid over the thin wire means 22 through the center bore 74 to abut the bottom of the horizontal surface 14. Next, the thin wire means 22 is secured to the head of the bolt 74 using the screws 78. Finally, the nut 72 is backed off or unscrewed from the bolt 74 to tension the thin wire means 22 without twisting the thin wire means 22.

Referring now to FIG. 3, another alternate embodiment of the locking means 24 will be described. In this embodiment, the locking means 24 comprises a drawback-type bushing 80 with a collar 82 used to secure the thin wire mean 22 to the head of the bolt, rather than a pair of screws 78 as shown with the drawback bushing 70 in FIG. 2. The internally threaded nut 84 is also externally threaded to accept a security coded socket head nut 86 with a coded socket 88 that may be screwed over the nut 84 once the drawback bushing has been used to tension the thin wire means 22.

The theft deterrent device 10 of the present invention is not designed to be a theft-proof device. Rather, the principal objective of the present invention is to present the appearance of a more substantial locking mechanism and to provide an adequate amount of holding force to create a significant deterrent to the removal of the item 12 from the horizontal surface under most conditions. By using a high tensile wire, such a piano wire, having a tensile strength approximately 350,000 psi that is secured in the center of the bottom surface area 18, the device 10 can provide up to 800 lbs of vertical holding force to keep the secured item 12 anchored to the horizontal surface 14. In this manner, the device 10 can deter the theft or removal of items secured by the present invention because the secured item 12 cannot be lifted from the horizontal surface without significant damage to the secured item 12. The combination of the spacer 32 and the cover means 34 also serve to deter a potential theft of the secured item 12 by attempting to cut the spacer 32 or detach the cover means 34 from the bottom of the horizontal surface 14.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. Apparatus for securing an appliance-like item, the secured item having support means for supporting the secured item in an upright position and a bottom surface area, the apparatus comprising:

a generally horizontal surface to which the appliance-like item is secured, the horizontal surface including:

a top face and a bottom face, the top face of the horizontal surface in contact with the bottom support means and generally parallel to and not in contact with the bottom surface area when the secured item is in an upright position on the horizontal surface; and a small drill hole less than approximately 1.5 MM in diameter in the horizontal mounting surface; and a theft deterrent device comprising:

anchor means for securing the theft deterrent device to the bottom surface area of the secured item;

a thin high tensile wire means with a tensile of between 300,000–350,000 psi having a diameter of less than approximately 1.4 MM operably connected to the anchor means for extending through the small drill hole; and locking means below the bottom face of the horizontal surface for coupling with and tensioning the thin high tensile wire means to limit any horizontal movement of the secured item such that any vertical removal of the secured item is effectively prevented by the thin high tensile wire means, whereby when the thin wire means is extended through the small drill hole and coupled with the locking means the theft deterrent device is secured to the horizontal surface, the small drill hole being of a maximum diameter such that the small drill hole may be filled in after the thin wire means is removed without permanent and observable damage to the horizontal surface.

2. The theft deterrent device of claim 1 wherein the anchor means comprises:

an anchor plate having means for connecting to the thin wire means depending from the lower surface of the anchor plate; and a high tensile adhesive means attached to the upper surface of the anchor plate for adhering the anchor plate to the bottom surface area of the secured item.

3. The theft deterrent device of claim 2 wherein the means for connecting to the thin wire means comprises:

an anchor ear depending perpendicular from and attached to the anchor plate by a bend line, the anchor ear being formed as a cut out portion of the center of the anchor plate;

an aperture in the anchor ear having a center line perpendicular to the plane of the anchor ear; and a screw or rivet disposed through the aperture for attaching to the thin wire means.

4. The theft deterrent device of claim 3 wherein the thin wire means further comprises a wound wire end for engaging with the rivet or screw to attach the anchor ear to the thin wire means.

5. The theft deterrent device of claim 1 further comprises means for simulating more substantial locking means than the actual mechanism for securing the secured item to the horizontal surface.

6. The theft deterrent device of claim 5 wherein the means for simulating more substantial locking means comprises spacer means disposed between the bottom surface of the secured item and the top surface of the horizontal surface and about the thin wire means for simulating the appearance of a large bolt.

7. The theft deterrent device of claim 6 wherein the spacer means is a case hardened tube member having an inner circular cross-sectional area slightly greater than the width of the anchor ear pending perpendicular from the anchor plate such that the tube member will rotate about the anchor ear means when a horizontal cutting force is applied to an outer surface of the case hardened tube member.

8. The theft deterrent device of claim 5 wherein the means for simulating more substantial locking means comprises a cup means surrounding the locking means and operably connected with high tensile adhesive to the bottom face of the horizontal surface for simulating the appearance of a large nut and hiding the locking means.

9. The theft deterrent device of claim 1 wherein the locking means comprises:

a locking bushing means for securing the thin wire means between the anchor plate ear and the bottom face of the horizontal surface.

* * * * *

UNITED STATES PATENT AND TRADEMARK OFFICE

CERTIFICATE OF CORRECTION

PATENT NO. : 4,934,649

DATED : June 19, 1990

INVENTOR(S) : Glenn M. Stout and Bryan D. Stout

It is certified that error appears in the above-identified patent and that said Letters Patent is hereby corrected as shown below:

Column 2, line 4, delete "to the device";

Column 2, line 48, delete "many";

Column 4, line 21, delete "protection" and insert --prevention-- therefor;

Column 5, line 29, delete "nd" and insert --and--;

Column 6, line 6, after "such" add --as--.

Column 6, line 30, after "having" add --bottom--.

Signed and Sealed this

Twenty-sixth Day of November, 1991

*Attest:*

HARRY F. MANBECK, JR.

*Attesting Officer* *Commissioner of Patents and Trademarks*